(12) United States Patent
Gottwald (10) Patent No.: US 9,133,751 B2
(45) Date of Patent: Sep. 15, 2015

(54) DEVICE FOR SUPPLYING A REDUCING AGENT TO AN EXHAUST-GAS AFTERTREATMENT SYSTEM

(75) Inventor: Frank Gottwald, Weissach (DE)

(73) Assignee: Robert Bosch GmbH, Stuttgart (DE)

(*) Notice: Subject to any disclaimer, the term of this patent is extended or adjusted under 35 U.S.C. 154(b) by 95 days.

(21) Appl. No.: 13/991,397

(22) PCT Filed: Oct. 21, 2011

(86) PCT No.: PCT/EP2011/068386
§ 371 (c)(1),
(2), (4) Date: Aug. 16, 2013

(87) PCT Pub. No.: WO2012/072334
PCT Pub. Date: Jun. 7, 2012

(65) Prior Publication Data
US 2013/0318950 A1    Dec. 5, 2013

(30) Foreign Application Priority Data

Dec. 2, 2010 (DE) .......................... 10 2010 062 333

(51) Int. Cl.
*F01N 3/00* (2006.01)
*F01N 3/20* (2006.01)

(52) U.S. Cl.
CPC .............. *F01N 3/208* (2013.01); *F01N 3/2066* (2013.01); *F01N 2610/02* (2013.01); *F01N 2610/10* (2013.01); *F01N 2610/1406* (2013.01); *Y02T 10/24* (2013.01)

(58) Field of Classification Search
CPC ... F01N 3/208; F01N 3/2066; F01N 2610/02; F01N 2610/1406
USPC ..................................... 60/272–324; 422/168
See application file for complete search history.

(56) References Cited

U.S. PATENT DOCUMENTS

2001/0037680 A1* 11/2001 Buck et al. .................. 73/304 C
2006/0230931 A1* 10/2006 Bliss et al. ...................... 95/130

(Continued)

FOREIGN PATENT DOCUMENTS

CN        1890462       1/2007
DE     102007028147   12/2008

(Continued)

OTHER PUBLICATIONS

International Search Report for Application No. PCT/EP2011/068386 dated Feb. 17, 2012 (3 pages).

*Primary Examiner* — Jesse Bogue
*Assistant Examiner* — Kelsey Stanek
(74) *Attorney, Agent, or Firm* — Michael Best & Friedrich LLP (57) ABSTRACT

The invention relates to a device (10) for supplying to an exhaust-gas aftertreatment system a reducing agent (42), in particular a urea-water solution for the reduction of nitrogen oxides in the exhaust-gas flow of a diesel engine, having a tank (40) for the reducing agent (42) and having a delivery module (14) for delivering the reducing agent (42) out of the tank (40) via an in particular electrically heatable suction line (16). According to the invention, a) the suction line (16) which runs outside the tank (40) is connected to a pump sump (12) situated in the region of the tank base (44), b) an in particular electrically operated pump sump heater (30) is arranged in the region of the pump sump (12), c) at least one in particular electrically operated heating rod (36) extends into the tank (40), and d) at least one fill level sensor (18) runs outside the tank (40). The pump sump heater (30), the heated suction line (16), the heating rod (36) and an optional elastic compensating element (26) in the region of the pump sump (12) permit a substantially temperature-independent supply of the reducing agent (42) to an exhaust-gas aftertreatment system of a diesel engine. The pump sump (12) which is mounted on the bottom of the tank (40) furthermore makes it possible for the reducing agent (42), which must be available in the exact dose for correct execution of the SCR method, to be supplied virtually completely independent of position, and nevertheless uniformly, to the exhaust-gas aftertreatment system.

20 Claims, 7 Drawing Sheets

(56) References Cited

U.S. PATENT DOCUMENTS

| | | | |
|---|---|---|---|
| 2007/0163245 A1 | 7/2007 | Sheridan et al. | |
| 2009/0266442 A1* | 10/2009 | Duscher et al. | 141/95 |
| 2012/0186237 A1* | 7/2012 | Bruck et al. | 60/287 |

FOREIGN PATENT DOCUMENTS

| | | |
|---|---|---|
| DE | 102007059853 | 6/2009 |
| DE | 102008041723 | 3/2010 |
| DE | 102008041805 | 3/2010 |
| EP | 1712754 | 10/2006 |
| FR | 2916476 | 11/2008 |
| JP | 2000027627 | 1/2000 |
| JP | 2000065624 | 3/2000 |
| JP | 2001228868 | 8/2001 |
| JP | 2005282413 | 10/2005 |
| JP | 2007513289 | 5/2007 |
| JP | 2008293978 | 12/2008 |
| JP | 2009144644 | 7/2009 |
| JP | 2010156283 | 7/2010 |
| WO | 2010/023118 | 3/2010 |
| WO | 2010028814 | 3/2010 |
| WO | 2010078989 | 7/2010 |
| WO | 2011086038 | 7/2011 |

* cited by examiner

DEVICE FOR SUPPLYING A REDUCING AGENT TO AN EXHAUST-GAS AFTERTREATMENT SYSTEM

BACKGROUND OF THE INVENTION

In motor vehicles with internal combustion engines, in particular diesel engines, it is necessary, owing to the ever more stringent legal exhaust-gas limit values, to further reduce inter alia air pollutants such as for example nitrogen oxides (NOx), in the exhaust-gas flow. A widely used method which is applied here is catalytic reduction, that is to say the so-called SCR method ("Selective Catalytic Reduction"). Here, during the operation of an internal combustion engine, in particular of a diesel engine, a liquid reducing agent is delivered by means of a pump from a storage vessel to a dosing module with an injection nozzle in the region of a catalytic converter in the exhaust pipe. As reducing agent, use is generally made of a 32.5% urea-water solution, which is marketed under the trade name "AdBlue®". In this connection, it must be taken into consideration that said urea-water solution freezes at a temperature below −11° C., and thermally decomposes above 60° C., such that, in particular for winter operation at low temperatures, heating devices must be provided in order to ensure the necessary ice pressure resistance.

The prior art discloses numerous devices for storing the urea-water solution required for the SCR method in diesel engines and for supplying said reducing agent to the exhaust-gas aftertreatment systems. DE 10 2008 041 723 A1 discloses a tank for storing a liquid active substance. One end of a flexible suctioning lance is surrounded, in the vicinity of the tank base, by a heating means, wherein the suctioning line additionally has heating wires on the inside and/or on the outside. The entire arrangement is situated in a slosh pot in order to permit attitude-independent suctioning of the reducing agent. Laterally on the slosh pot there is situated a fill level sensor. The slosh pot and the fill level sensor are arranged within a tank. An electrical connection line of the fill level sensor and the suctioning line are provided with a fabric hose as protection against mechanical abrasion. Since the fill level sensor does not have a direct heating device, it cannot be ruled out that said fill level sensor will freeze, in particular in the event of frost temperatures prevailing over a long period of time. DE 10 2008 041 805 A1 discloses a further tank arrangement. The ice pressure resistance is realized in said tank by an air cushion situated beneath the tank cover, which air cushion is formed even in the case of a maximum fill level. To generate the air cushion, a cubical or hollow cylindrical space delimitation means is for example provided beneath the tank cover, which space delimitation means is open toward the tank base. During the filling of the tank, therefore, an air cushion forms in the space delimitation means because the air cannot escape laterally out of the space delimitation means. In the event of freezing of the tank contents, said air cushion is compressed, whereby damage to the tank is prevented. In the event of extreme oblique positions of the tank, however, the ice pressure resistance cannot be ensured because the air cushion can at least partially escape out of the space delimitation means.

DE 10 2007 059 853 A1 relates to a device for the measurement of a fill level of a liquid in a vessel. For the fill level measurement, an ultrasound transducer is arranged in the region of the tank base, the ultrasound beam of which runs parallel to the tank base. By means of a diverting element on the tank base, the ultrasound beam is diverted through 90° and directed from below to the liquid surface through a measurement pipe, is reflected back from there and is conducted by the diverting element back to the ultrasound transducer. By means of evaluation electronics connected downstream of the ultrasound transducer, the level of the liquid level in the tank can be determined from the reflected ultrasound signal. Said device for measuring a vessel surface level however requires an extremely large amount of technical outlay.

DE 10 2007 028 147 A1 furthermore discloses a device for detecting the fill level of a liquid in a vessel, said device being realized with a pressure sensor. The pressure sensor is arranged in the region of the vessel base and is surrounded by a cylindrical housing, the height of which corresponds approximately to the maximum fill level. The housing is penetrated by a multiplicity of small compensation openings which impart a throttling action to the liquid flowing through, such that substantially only the hydrostatic pressure of the liquid acts on the sensor. In this way, the output signal of the sensor has a high degree of temporal constancy. Excessive tilting of the vessel or freezing of the liquid at least in regions, however, can under some circumstances influence the measurement result.

It is therefore an object of the invention to provide a device for reliably supplying a reducing agent to an exhaust-gas aftertreatment system of a diesel engine, which device ensures a reliable discharge of the reducing agent to the exhaust-gas aftertreatment system under all ambient conditions and operating states that normally arise in motor vehicles, which device simultaneously permits precise detection and monitoring of the reducing agent level, which device is of simple construction, and which device, owing to a low space requirement or a compact design, can be easily integrated into a motor vehicle.

SUMMARY OF THE INVENTION

There is disclosed a device for supplying a reducing agent, in particular a urea-water solution for the reduction of nitrogen oxides in the exhaust-gas flow of a diesel engine, to an exhaust-gas aftertreatment system, which device has a tank for the reducing agent and a delivery module for conveying the reducing agent out of the tank via an in particular electrically heatable suctioning line.

According to the invention, a) the suctioning line, which runs outside the tank, is connected to a pump situated in the region of a tank base, b) an in particular electrically operated pump sump heater is arranged in the region of the pump sump, c) at least one, in particular electrically operated heating bar extends into the tank, and d) at least one fill level sensor runs outside the tank.

In this way, in particular at ambient temperatures below −11° C., fail-safe operation of the device is attained, such that the supply of the reducing agent to a downstream exhaust-gas aftertreatment system is ensured even at such low ambient temperatures. Furthermore, the device according to the invention permits a substantially attitude-independent supply of the purification agent, or the AdBlue®, to the exhaust-gas purification system.

Owing to the pump sump which is mounted on the underside on the tank base and which is not formed integrally with the tank, there is always, regardless of the attitude of the device in space, an adequate amount of reducing agent present in the region of the suctioning line, whereby substantially attitude-independent and uniform suctioning of the reducing agent by means of the delivery module is possible. This permits the virtually attitude-independent and temperature-dependent supply, to a downstream exhaust-gas aftertreatment system, of the reducing agent required for the execution of the catalytic exhaust-gas purification during the course of the SCR process. The delivery module is a conventional pump, such as for example a diaphragm-type pump, a gearwheel-type pump, a rotary pump, a hose pump, a piston pump or the like, which if required is protected against icing by means of a preferably electrically operated heating device.

By means of the preferably electrically operated pump sump heater, it is possible for a region or a cavity above the pump sump to be kept free from ice, such that even in the event of low temperatures prevailing for a long time, reliable suctioning of the reducing agent by the delivery module is possible. The pump sump heater is fastened above the pump sump by means of ice-pressure-resistant brackets or a suitable bracket arrangement. The pump sump has an approximately pot-shaped or approximately frustoconical, internally hollow geometric shape with a suitable, encircling side wall.

The tank may also have a complex three-dimensional shape which deviates from simple geometric spatial shapes (so-called free-form tank). In this way, the device can be installed even in motor vehicles with restricted, structurally predefined space conditions. The pump sump and the suctioning point are preferably situated at the lowest point of the tank. To prevent icing of the suctioning line, the latter is designed to be resistant to ice pressure and is likewise equipped with a suitable, preferably electrically operated electric heating device. Furthermore, the suctioning line runs from the pump sump to the delivery module outside the tank. In this way, said suctioning line does not come into contact with the reducing agent which, under some circumstances, freezes to form a solid block, such that only relatively low electrical heating power is necessary to keep the suctioning line free.

The generally likewise electrically operated heating bar extends preferably over the full height of the tank in order, in the event of the tank contents being at least partially frozen, to create a ventilation channel between the tank vent situated on the top side of the tank and the pump sump or the suctioning point, and to keep said ventilation channel free. The ventilation duct runs from a top-side tank vent, along the heating bar through the frozen reducing agent, to the cavity in the region of the pump sump. In this way, correct suctioning of the reducing agent by the delivery module is ensured even in the event of the tank contents being at least partially frozen. The heating bar is preferably fastened to the pump sump heater.

The reducing agent fill level in the tank is detected continuously by means of an ice-pressure-resistant, hose-like fill level sensor which runs along, or is arranged on, the outside of the tank. Here, the level of the reducing agent in the fill level sensor always corresponds, owing to the principle of the communicating tubes, to the fill level of the reducing agent in the tank.

The pump sump covers a tank opening in the region of the tank base, and the tank has at least one tank vent.

In this way, a space is formed which is always filled with reducing agent, and the reducing agent reservoir of which is substantially insensitive to sloshing movements in the tank, such that sufficient reducing agent for uniform suctioning is always present in the region of the pump sump. As a result, a diameter of the pump sump is considerably larger than an inner diameter of the tank opening arranged in the tank base. The pump sump mounted on the underside of the tank is preferably fastened by welding. Other fastening techniques, such as for example adhesive bonding, clamping, pressing or screw connection, may alternatively also be used for fastening the pump sump to the tank. To facilitate the mounting of the pump sump onto the tank opening, there is formed on said pump sump an encircling flange with an approximately rectangular cross-sectional geometry. Depending on the selected fastening type, the flange may be provided with sealing means and/or with a thread. The tank vent allows the reducing agent to be delivered out in an unhindered manner, because the generation of a negative pressure in the tank is prevented.

In a further advantageous embodiment of the device, it is provided that at least one compensating element is positioned in the region of the pump sump. The ice pressure resistance of the device is further optimized in this way. The compensating element is preferably of annular design and placed into the pump sump, or fastened therein in some other way, for example by clamping, adhesive bonding or inlaying. In this way, the required ice pressure resistance in the region of the pump sump is ensured. The compensating element is preferably produced with a sufficiently compressible and chemical-resistant plastics material, such as for example EPDM (Ethylene Propylene Diene Monomer) rubber.

In one refinement, it is provided that at least one filter element is arranged in the region of the pump sump.

Said filter element prevents suctioning of any foreign particles or dirt particles contained in the reducing agent, and associated clogging or blockage of the delivery module and failure of the exhaust-gas aftertreatment system as a whole. The filter element may be in the form of a so-called 3D filter.

In a further advantageous refinement, the fill level sensor is formed with at least two resistance wires which are provided with a plastics sheathing and which can come into electrically conductive contact with the reducing agent.

The preferably two resistance wires are produced with a metal alloy which has adequate chemical resistance with respect to the reducing agent or the AdBlue®. The preferably helically coiled resistance wires are only partially embedded in the electrically insulating plastics sheathing of the fill level sensor. This means that resistance wires with a for example circular cross-sectional geometry are only approximately half sunk into the plastics sheathing which forms the outer casing of the fill level sensor. Here, the resistance wires run on the inside in the plastics sheathing of the fill level sensor. This firstly produces the required sealing action with respect to the reducing agent that rises and falls in the fill level sensor, and secondly permits the electrical contact, necessary for the fill level measurement, between the resistance wires and the reducing agent. The plastics sheathing, which is formed in a continuous manner and has a wall thickness of preferably 1 mm to 5 mm, furthermore imparts the required inherent mechanical stability to the fill level sensor and at the same time provides the necessary electrical insulation between the resistance wires. As a result, therefore, the fill level sensor is approximately in the form of a conventional spiral hose with a "spiral reinforcement" partially exposed in the hose interior. Each spiral of the resistance wire constitutes a chain-like series connection of a multiplicity of electrical resistances which, up to the fill level, are short-circuited by the electrically conductive reducing agent. Accordingly, an ohmic resistance that can be measured between the two spiral-shaped resistance wires is proportional to the fill level of the reducing agent. The resistance wires may alternatively run rectilinearly. Instead of resistance wires, use may be made of metal wires with any desired alloy composition, which must however be chemically resistant with respect to the reducing agent.

A further refinement of the device provides that at least two cables, in particular for a supply to the electrically heatable suctioning line, to the pump sump heater and to the heating bar, run substantially along the suctioning line.

In this way, the electrical cabling of the device is simplified. The electrical supply lines or the cables may run within or outside the suctioning line. It is possible for a casing, for example a cable spiral or a spiral hose, to be provided in portions in order to combine the cables and the suctioning line to form one strand-like entity.

A further advantageous refinement of the device provides that the fill level sensor and the suctioning line and also the at least two cables are surrounded at least in portions by a thermal insulation sheathing.

The thermal insulation sheathing firstly reduces the energy required for the electric heating of the stated components, because the heat losses are reduced. Secondly, the thermal insulation sheathing bundles or combines the stated components to form one strand, whereby in particular the mounting process is simplified. The electrical cables and the suctioning line may, to simplify mounting within the insulation sheathing, be provided at least in portions with a casing. The thermal insulation sheathing may be formed with any desired materials which exhibit good thermal insulation, such as for example closed-cell plastics foams or the like.

In an alternative embodiment, it is provided that the cables and the suctioning line run within the fill level sensor.

This yields a further simplification of the structural design, because the fill level sensor approximately coaxially surrounds the suctioning line and the at least two cables. Before the electrical supply cables and the suctioning line are drawn into the fill level sensor, it may be advantageous for both the cables and also the suctioning line to be combined at least in portions, so as to form a bundle or a strand-like entity, by means of an additional casing.

The fill level sensor preferably has at least one vent, in order to prevent measurement errors during the determination of the fill level. The vent of the fill level sensor is preferably arranged at the same height as or higher than the tank vent.

A further embodiment of the device provides that the pump sump is arranged in the region of an elevation or of a depression of the tank base. In this way, the suctioning behavior can be further improved in particular in the case of low reducing agent surface levels in the tank.

BRIEF DESCRIPTION OF THE DRAWINGS

The invention will be explained in more detail below on the basis of the drawing, in which.

DETAILED DESCRIPTION

Figure 1:
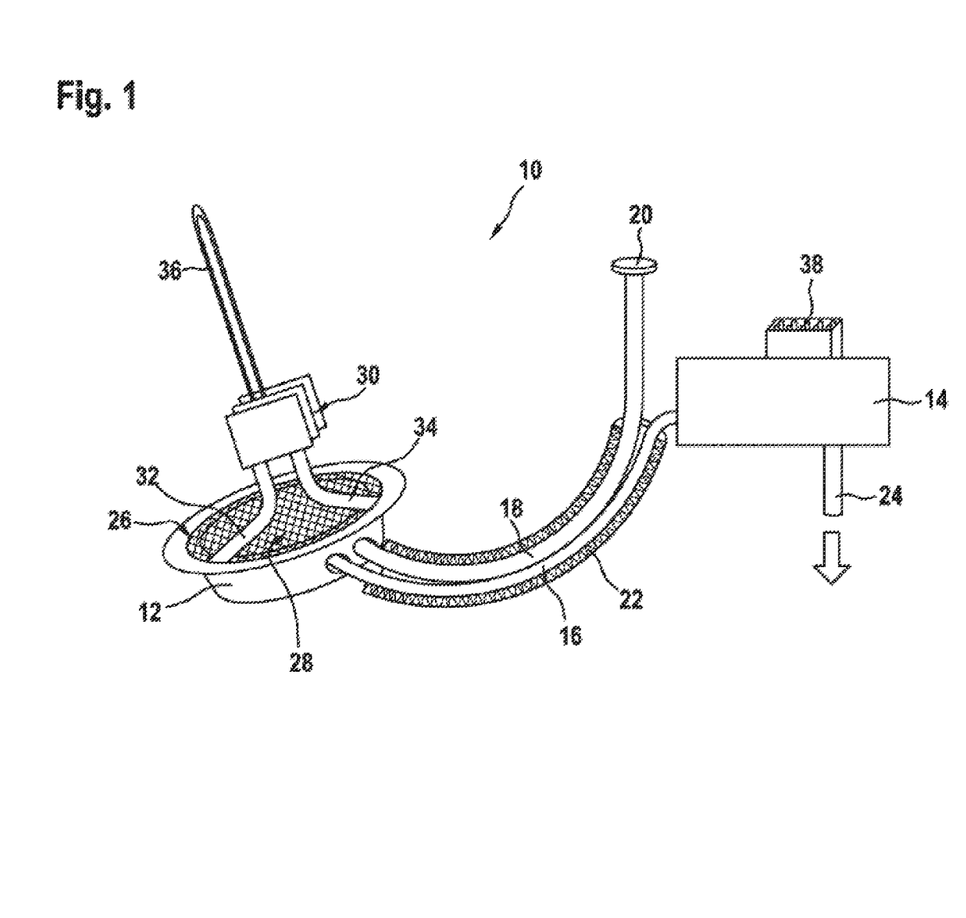
FIG. 1 is a schematic illustration of the device without a tank.

FIG. 1 is a schematic illustration of the device according to the invention.

The device 10 comprises inter alia an approximately pot-shaped pump sump 12 which is connected to a delivery module 14 via a heated and ice-pressure-resistant suctioning line 16. By contrast to the pot-shaped form of the pump sump 12 shown in the example, said pump sump may for example also have the geometric form of an internally hollow truncated cone portion with a distinctly oblique encircling wall. To the pump sump 12 there is connected a fill level sensor 18 which has, at its upper end, a vent 20. To minimize the heat losses, both the heated suctioning line 16 and also the fill level sensor 18 are completely surrounded by an insulation sheathing 22. The pump sump 12 is fastened in the region of a tank opening on the underside of a tank not illustrated in FIG. 1. The tank serves for storing the reducing agent required for carrying out the SCR method. As reducing agent for the SCR method, use is normally made of so-called AdBlue® which is an approximately 32.5% urea-water solution. By means of the delivery module 14, the reducing agent is sucked out of the tank from the pump sump 12 via the suctioning line 16, and is delivered via a hydraulic connecting line 24 to a catalytic exhaust-gas purification system (not illustrated). To ensure the required ice pressure resistance of the device 10, an annular, elastic compensating element 26 is arranged in the pump sump 12. The compensating element 26 is produced with an elastic plastics material, such as for example EPDM, which has adequate chemical resistance with respect to the AdBlue®. The compensating element 26 may for example be adhesively bonded, pressed, clamped, vulcanized or else merely loosely placed into the pump sump 12. Owing to the compensating element 26, expansion movements of the reducing agent, which freezes below −11° C., in the region of the pump sump 12 are absorbed by a corresponding deformation of the compensating element 26, whereby the necessary ice pressure resistance of the device 10 is ensured. To prevent dirt particles and other foreign bodies from the tank from passing into the delivery module 14 and/or into the exhaust-gas purification system (not illustrated) of the internal combustion engine, which dirt particles and other foreign bodies could lead to clogging and/or total failure of the exhaust-gas purification system as a whole, a disk-shaped filter element 28 is provided which extends preferably over the entire cross-sectional area of the pump sump 12. The filter element 28 is preferably a so-called 3D filter element. The pump sump 12 ensures that an adequate amount of reducing agent is always present in the region of the suctioning line 16, and thus substantially attitude-independent delivery of said reducing agent by means of the delivery module 14 is possible. Above the pump sump 12 there is also arranged a preferably electrically operated pump sump heater 30 which, in the exemplary embodiment shown, has three plate-shaped heating elements arranged in each case uniformly parallel to and spaced apart from one another. The fastening of the pump sump heater 30 is realized by means of two brackets 32, 34 which exhibit the necessary ice pressure resistance. Above the pump sump heater 30 there is positioned a heating bar 36 which extends over the entire height of the tank to a tank vent which is likewise not illustrated in FIG. 1. By means of the pump sump heater 30, it is possible even in the case of at least partially frozen reducing agent for a cavity (not illustrated here) which is filled with liquid reducing agent for supply to the exhaust-gas purification system to be produced above the pump sump 12 by thawing. In order to ensure adequate venting of the tank in this case too, it is possible by means of the heating bar 36 for an air channel (not illustrated here) in the frozen reducing agent to be produced and permanently kept free by partial melting of said frozen reducing agent, which air channel produces a continuous connection between the tank vent and the cavity in the region of the pump sump 12. Both the heater of the suctioning line 16 and also the pump sump heater 30 and the heating bar 36 are preferably electrically operated and, ideally, are fed with current via only two electrical supply cables. For this purpose, said heating devices are connected electrically in parallel. The delivery module 14 is likewise preferably electrically operated, wherein the power supply is realized via a conventional plug connector 38.

Figure 2:
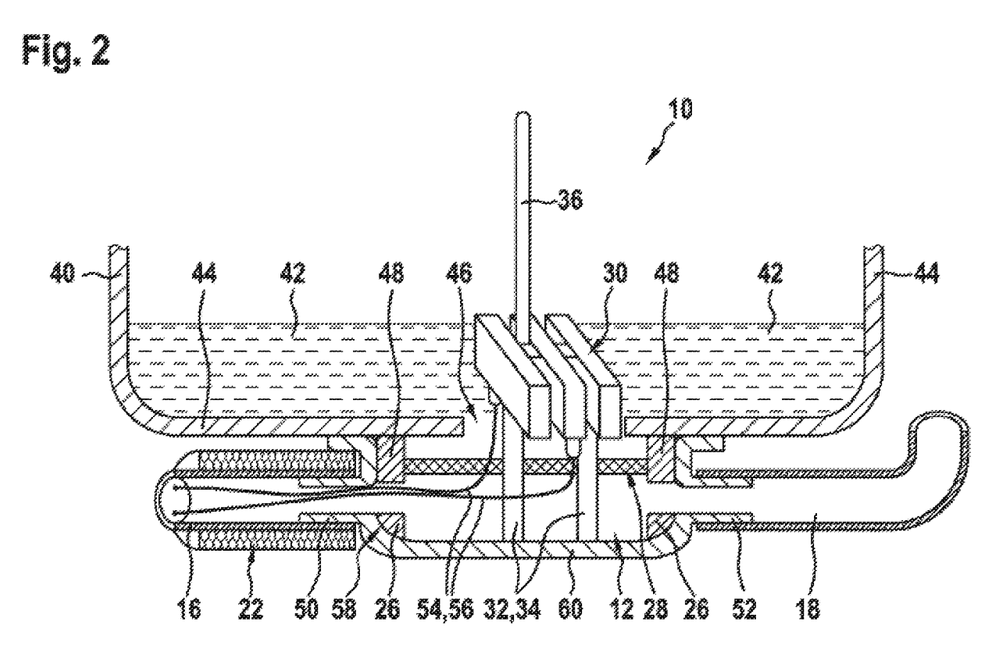
FIG. 2 shows a schematic cross section through the pump sump mounted on the tank.

FIG. 2 is a schematic cross-sectional illustration of the tank with pump sump mounted thereon.

A tank 40 as a further system component of the device 10, which tank serves for storing the reducing agent 42, has a substantially planar tank base 44. In the tank base 44 there is formed a circular tank opening 46. Said tank opening is bordered by an encircling flange 48 which is advantageously formed integrally with the tank 40. The flange 48 facilitates the mounting of the pump sump 12 on the underside of the tank base 44, this preferably being realized by welding. A diameter, which for better clarity of the drawing is not denoted by a reference sign here, of the tank opening 46 is selected to be considerably smaller than an inner diameter, likewise not provided with a reference sign, of the pump sump 12, such that the pump sump 12 completely covers the tank opening 46.

In the exemplary embodiment of FIG. 2, two tubular connectors 50, 52 are formed on the pump sump 12. To the connector 50 there is connected the suctioning line 16 which is connected to the delivery module 14. The suctioning line 16, the fill level sensor 18 and/or the tubular connectors 50, 52 may have at least one cross-sectional narrowing which has the function of a throttle in order to dampen undesired sloshing movements in the tank 40. The connector 52 serves for the connection of the fill level sensor 18. The electrical supply to the pump sump heater 30 and to the heating bar 36 is realized by means of two cables 54, 56 which, in this example, are laid so as to run through the suctioning line 16. Alternatively, the cables 54, 56 can also run outside of the suctioning line 16. In such an arrangement, it may be advantageous for the suctioning line 16 and the cables 54, 56 to be combined, at least in portions, to form a strand-like entity by means of a casing, for example by means of a cable spiral, by means of cable ties, adhesive tape or the like. The suctioning line 16 is, by suitable measures, designed to be resistant to ice pressure and furthermore has a likewise preferably electrically fed heating device for preventing freezing of the reducing agent 42 in said region. To minimize the heat energy consumption, the suctioning line 16 with the electrical cables 54, 56 running therein is completely surrounded by the insulation sheathing 22. By contrast to the arrangement shown, the fill level sensor 18 may advantageously be encased, together with the heated suctioning line 16 and the cables 54, 56, by the insulation sheathing 22. In this way, heating of the fill level sensor 16 to prevent freezing is made superfluous. The pump sump heater 30 is fastened to the pump sump 12 by means of the two brackets 32, 34. Beneath the flange 48 is situated the substantially annular compensating element 26 which bears against an encircling, slightly inclined inner wall surface 58 and a base 60 of the pump sump 12. The filter element 28 is positioned beneath the tank opening 46. The positional fixing of the suctioning line 16 and of the hose-like fill level sensor 18 on the two connectors 50, 52 may be realized for example by means of clamping clips (not illustrated) or the like.

Figure 3:
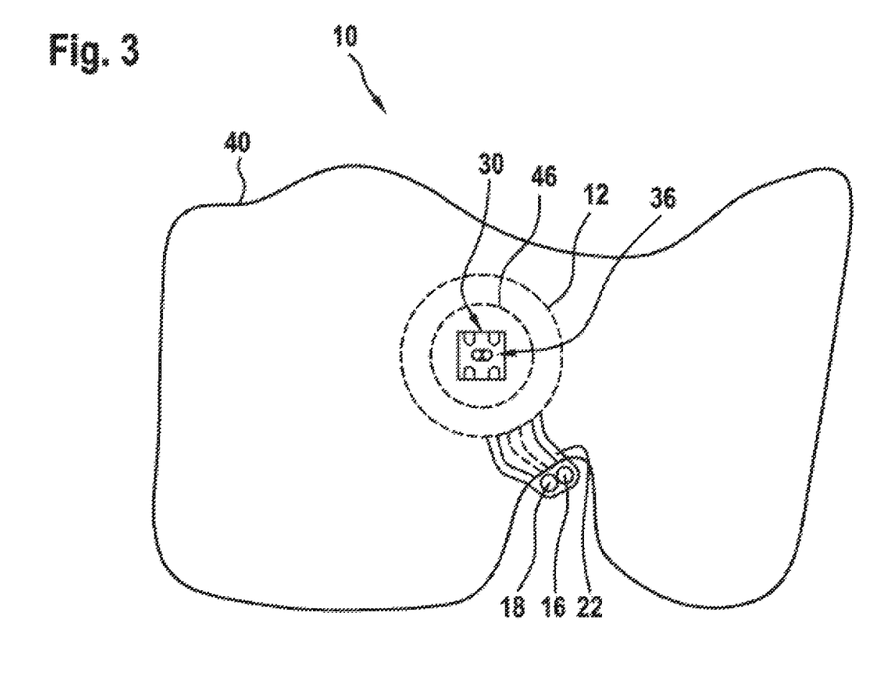
FIG. 3 shows a highly simplified plan view of the tank of the device.

FIG. 3 illustrates, in a highly simplified illustration, a plan view of the device 10.

Situated below the (free-form) tank 40, which has a complex geometric shape, is the pump sump 12 which covers the tank opening 46. The pump sump heater 30 and the heating bar 36 are arranged, by means of the brackets, approximately centrally above the pump sump 12. A diameter of the pump sump 12 is considerably larger than the diameter of the tank opening 46 in order to ensure adequate coverage and sealing action. By contrast to the illustration in FIG. 2, the suctioning line 16 and the fill level sensor 18 are in this case arranged on the same side of the pump sump 12. Furthermore, both the suctioning line 16 and also the fill level sensor 18 are encased by the insulation sheathing 22, whereby separate heating of the fill level sensor is made superfluous.

Figure 4:
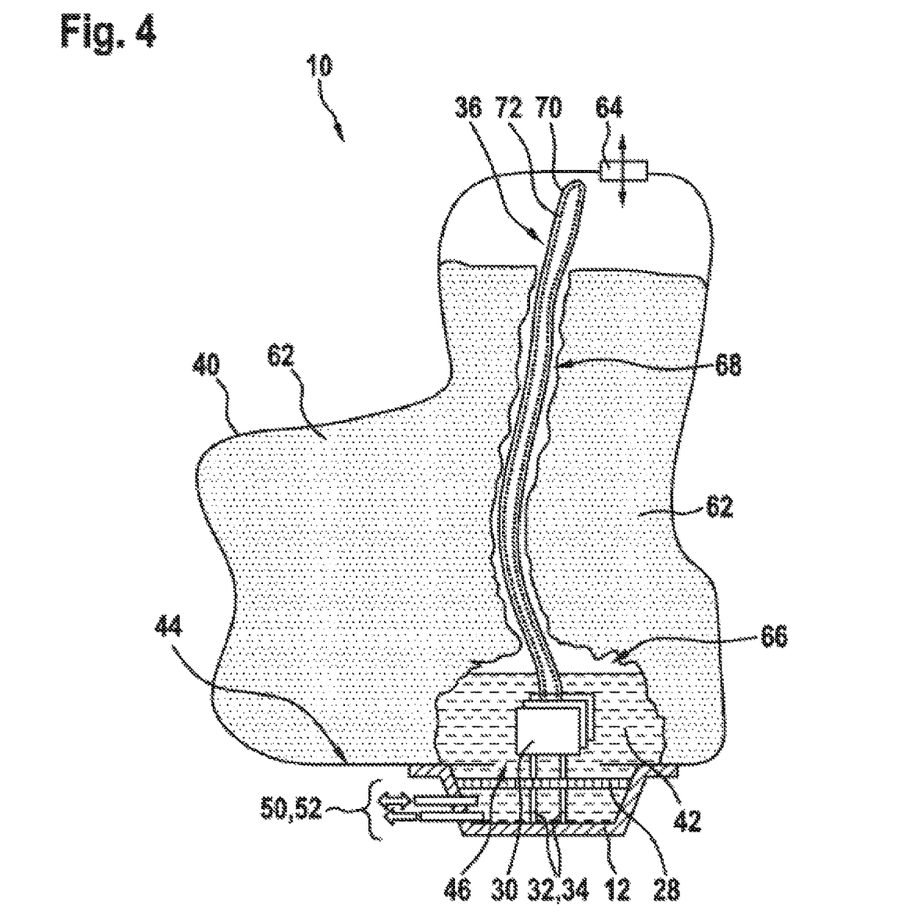
FIG. 4 is a schematic cross-sectional illustration of the device, wherein the tank contents are partially frozen.

FIG. 4 shows a cross section through the device 10 in the case of the reducing agent being almost completely frozen.

Owing to a low ambient temperature, the tank 40 is filled predominantly with frozen reducing agent 62 or with "ice". The tank 40 has a tank vent 64 arranged on the top side in order to permit an unhindered delivery of the reducing agent 42 by means of the delivery module (not illustrated here). For this purpose, the tank vent 64 permits the passage of air from the environment in both directions, as indicated by the black double arrow. The pump sump 12 covers the tank opening 46 formed in the tank base 44. The pump sump heater 30 is fastened above the pump sump 12 by means of the brackets 32, 34. The filter element 28 is situated below the tank opening 46. The two connectors 50, 52 for the suctioning line (not illustrated here) and the fill level sensor are led laterally out of the pump sump 12. By means of the electrically operated pump sump heater 30, it is possible for a cavity 66 to be melted into the frozen reducing agent 62 and kept free from ice, wherein the cavity 66 is filled almost entirely with the reducing agent 42 which is liquefied again in said zone. The liquefaction in the region of the pump sump 12 and of the cavity 66 takes place primarily under the action of the pump sump heater 30. In this way, the reducing agent 42 which is in the liquid state of aggregation is always available in the region of the connectors 50, 52, in amounts sufficient for uniform suction, substantially independently of the ambient temperature and the spatial attitude of the device 10. Situated above the pump sump heater 30 is the electrically operated heating bar 36, which extends approximately over the entire height of the tank 40 up to the tank vent 64. The heating bar 36 does not pose any significant mechanical resistance to the growth of ice in the tank 40, and is thus not destroyed even in the event of complete freezing of the reducing agent 42. By means of the heating bar 36, a ventilation channel 68 can be melted into the frozen reducing agent 62 and also permanently kept free. The ventilation channel 68 which surrounds the heating bar 36 on all sides permits a free exchange of air between the tank vent 64 and the cavity 66 such that, during the suctioning of the still-liquid reducing agent 42 by means of the delivery module, no negative pressure is generated in the tank 40, and an unhindered delivery of the reducing agent 42 by means of the delivery module is possible. The heating bar 36 comprises an encircling heating loop 70 which is formed with a suitable metal alloy with an adequate resistance. The heating loop 70 is provided or coated with a heating bar sheathing 72 which is formed with a plastics material which exhibits resistance with respect to the reducing agent or the AdBlue®.

Figure 5:
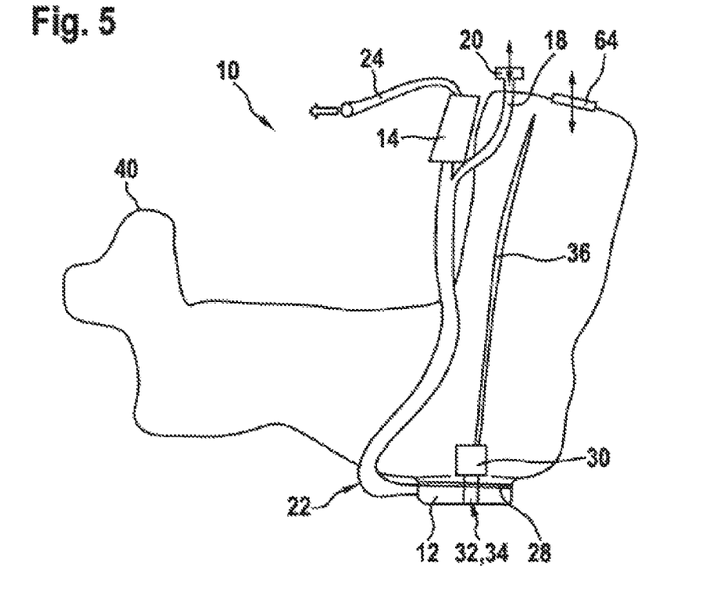
FIG. 5 shows a schematic overview of the line configuration.

FIG. 5 shows, in a schematic overview illustration, the line configuration of the device 10.

Situated on the top side of the free-form tank 40 is the tank vent 64 and the vent 20 of the fill level sensor 18. Extending from the delivery module 14 is the hydraulic connection line 24 which serves for the supply of the reducing agent to the exhaust-gas aftertreatment system (not illustrated). Situated in the region of a lowest point (not designated) of the tank 40 is the pump sump 12 with the pump sump heater 30 and the heating bar 36. Also fastened in the pump sump 12 are the two brackets 32, 34 for the positional securing of the pump sump heater 30 and of the heating bar 36. The filter element 28 is positioned transversely with respect to the brackets 32, 34. Laid within the insulation sheathing 22 are the fill level sensor 18 (partially visible) and the suctioning line 16 (completely hidden by the insulation sheathing 22) and the cables for the electrical supply to the pump sump heater 30 and to the heating bar 36. The insulation sheathing 22 which runs on the outside of the tank 40, or the suctioning line 16, fill level sensor 18 and electrical cables 54, 56 running in said insulation sheathing, connect the pump sump 12 to the delivery module 14 and to the vent 20 of the fill level sensor 18.

Figure 6:
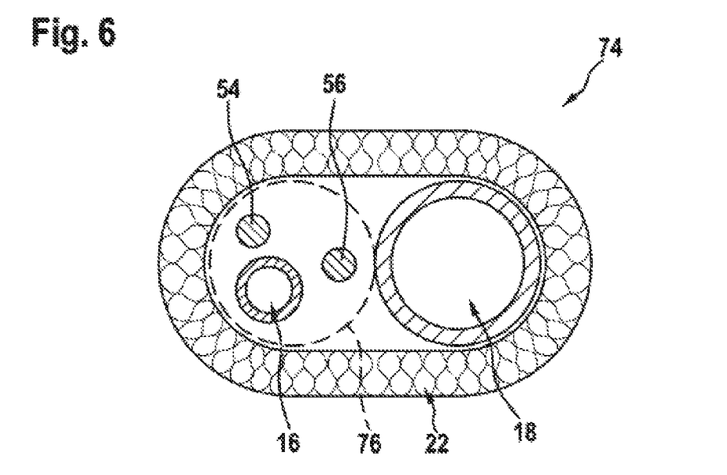
FIG. 6 is a cross-sectional illustration through the insulation sheathing with the fill level sensor, the suctioning line and the electrical cables.

FIG. 6 shows a simplified cross-sectional illustration through the insulation sheathing with the fill level sensor, the suctioning line and the electrical cables.

The insulation sheathing 22 encases the fill level sensor 18, the two electrical cables 54, 56 and the suctioning line 16 for the reducing agent 42, and as a result forms a compact connection strand 74 or a "cable-hose loom" with an approximately oval cross-sectional geometry which constitutes the sole connection between the pump sump and the delivery module 14 of the device. In this way, simpler handling and simpler installation and/or exchange of the device in a motor vehicle is made possible. The connection strand 74 furthermore permits the delivery of the reducing agent 42 out of the tank, and simultaneously a precise measurement, which is substantially independent of the attitude of the tank, of the fill level (surface) of the reducing agent 42 by means of the fill level sensor 18 integrated into the connection strand 74. To facilitate the mounting of the connection strand 74, the two electrical cables 54, 56 and the suctioning line 16 may be provided, at least in portions, with a casing 76. Said optional casing 76 need be neither electrically insulating nor chemically resistant with respect to the reducing agent 42, and may be produced for example by means of a conventional cable spiral, by means of cable ties, by means of adhesive tape or the like. By contrast to the construction shown in FIG. 6, the two electrical lines 54, 56 and the suctioning line 16 may also be laid approximately coaxially within the fill level sensor 18 itself, wherein a diameter of the fill level sensor 18 must be selected to be adequately large. In such an arrangement, an approximately circular cross-sectional geometry of the connection strand 74 is attained.

Figure 7:
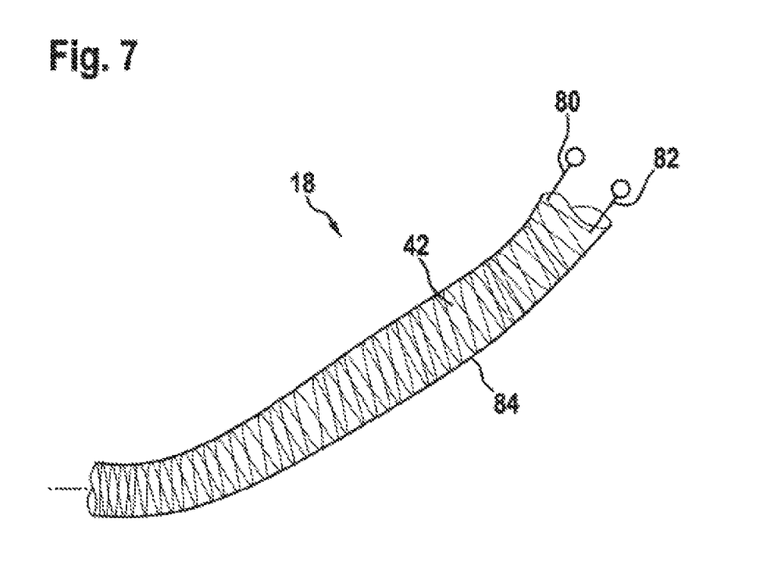
FIG. 7 is a schematic illustration of the fill level sensor.

FIG. 7 shows, in a schematic illustration, a possible design of the fill level sensor 18.

The hose-like fill level sensor 18 is formed with two for example helically coiled resistance wires 80, 82 which are covered on the outside by a plastics sheathing 84 formed with an electrically insulating plastics compound. The resistance wires 80, 82 are only partially embedded into the outer plastics sheathing 84. In this way, the reducing agent 42 situated in the fill level sensor 18, which reducing agent exhibits limited electrical conductivity, can come into direct electrical contact with the resistance wires 80, 82 which are (superficially) exposed in the region of an inner surface (not designated) of the fill level sensor 18. At the same time, the plastics sheathing 84 has the task of electrically insulating the two resistance wires 80, 82 with respect to one another. Since both the resistance wires 80, 82 and also the plastics sheathing 84 come into direct contact with the reducing agent 42 the stated components must exhibit adequate chemical resistance and corrosion resistance. The mode of operation of the fill level sensor 18 shall be explained in more detail below on the basis of the electrical equivalent circuit diagram illustrated in FIG. 8. Each resistance wire 80, 82 can be electrically represented by a series circuit or a resistance chain of a multiplicity of individual resistances. In the equivalent circuit diagram shown, the reducing agent has a fill level 86 which creates an electrical short circuit 88 between the two resistance chains. If the fill level 86 of the reducing agent 42 within the fill level sensor 18 changes, as indicated by the white double arrows, the ohmic resistance R, measurable between the two connecting terminals (not designated), of the overall arrangement also changes. Each fill level 86 can thus be assigned a measurable ohmic resistance value, which can be measured, evaluated and displayed for example by means of a microcontroller-based control and/or regulating unit (not illustrated). If the measured resistance R is approximately 0 ohms, the maximum possible fill level 86 has been reached, whereas a resistance R of ∞ (infinite) ohms represents a total absence of reducing agent (empty tank) or a line breakage. The resistance values R that can be measured between the connecting terminals (not designated in any more detail) of the fill level sensor 18 can, by means of suitable calibration, be converted by means of the microcontroller-based control and/or regulating unit into an absolute fill level or an absolute volume value of the remaining reducing agent amount situated in the tank. Possible sloshing movements in the tank owing to dynamic movements of the motor vehicle are attenuated by a narrowing or throttle (not illustrated) between the fill level sensor and the mounted pump sump. The throttle may be an integral constituent part of the fill level sensor 18. Any static oblique positions of the motor vehicle may be detected either by means of a suitable 3D attitude sensor and subsequently numerically factored out of the measurement result, may be eliminated by means of low-pass filtering of the measurement signal or may be allowed for by means of an arrangement of the fill level sensor in the vicinity of the tank center of gravity.

Figure 8:
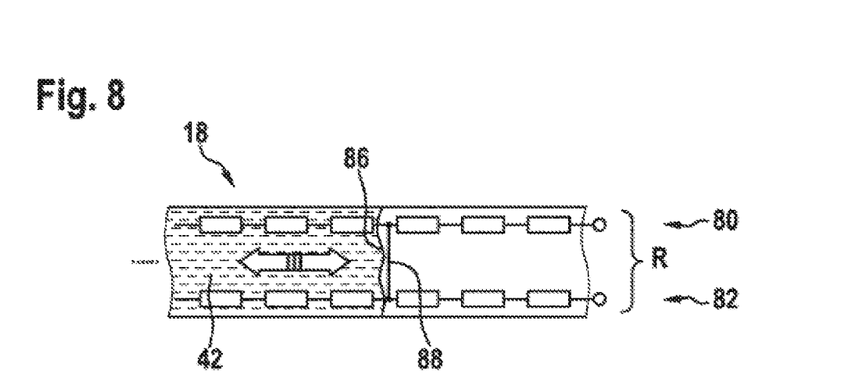
FIG. 8 shows an electrical equivalent circuit diagram of the fill level sensor.

Rapid changes in the resistance value with respect to time may furthermore indicate a leak of the fill level sensor 18. At least a simple warning signal for the driver of a motor vehicle, which warning signal indicates a low fill level of the reducing agent 42 in the tank and calls for prompt replenishment, can be derived from the measurement results of the fill level sensor 18 by means of the control and/or regulating unit.

Owing to the extremely high electrical conductivity of the reducing agent 42, a current strength of the (measurement direct) current flowing through the fill level sensor 18 must not be too large, because otherwise an electrolytic decomposition of the reducing agent 42 may occur, which furthermore leads to the formation of hydrogen gas. To minimize said undesired effects, it is advantageously possible, instead of direct current, for a (measurement) alternating current of low current strength to be used for determining the fill level in the tank 40 by means of the fill level sensor 18. For the evaluation of the resistance values, the two resistance wires 80, 82 are connected to the microcontroller-based control and/or regulating unit by means of at least two measurement cables or measurement lines (not illustrated here). The control and/or regulating unit may be an integral constituent part of the delivery module in order to attain as compact as possible an overall construction of the device.

Figure 9:
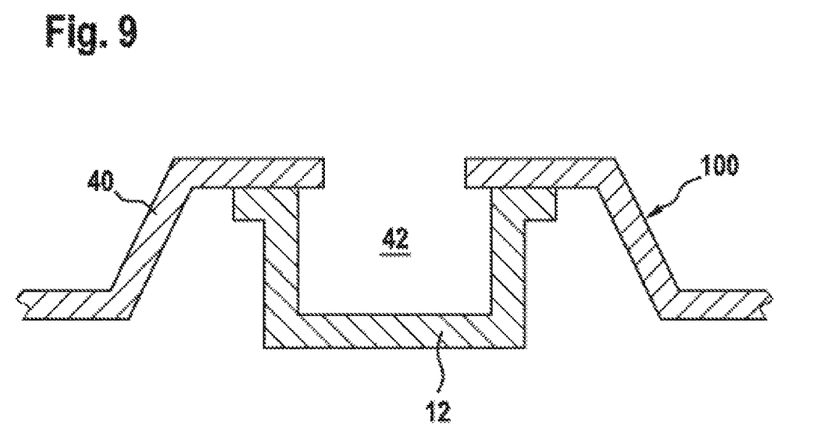
FIGS. 9 and 10 show two alternative embodiments of the tank base.
Figure 10:
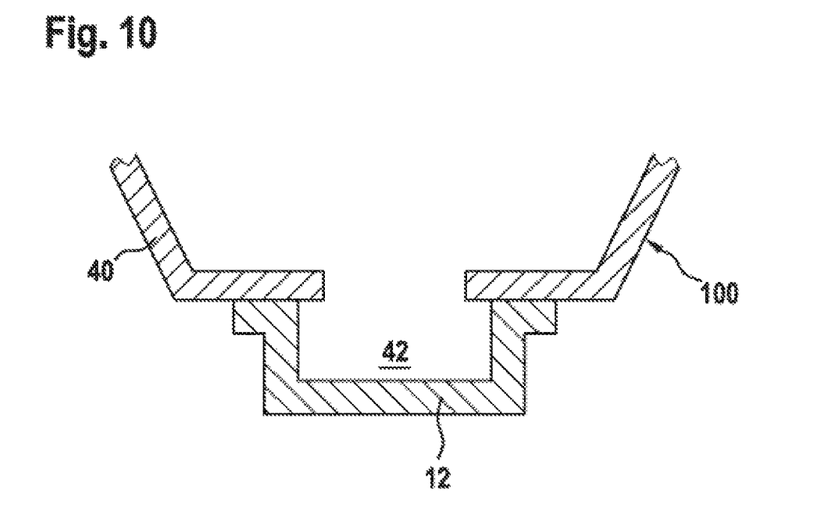

FIG. 9 and FIG. 10, which in the following description will be referred to simultaneously, show two alternative embodiments of the tank base of the tank 40 in a cross-sectional illustration.

By contrast to the embodiment of the tank base as per FIGS. 1 to 7, the tank base (not designated) of the tank 40 as per FIG. 9 has formed therein a bead-like elevation 100 with an approximately trapezoidal cross-sectional geometry, beneath which the pump sump 12 is fastened. Owing to the elevation 100, it is possible by means of sloshing or tilting movements of the reducing agent 42 in the tank 40 for the pump sump 12 to be filled successively with said reducing agent, such that an amount of the reducing agent 42 adequate for uniform suctioning by the delivery module is available in the pump sump 12 under all operating conditions of the motor vehicle. In the case of the second alternative embodiment of the tank base (not shown) as per FIG. 10, there is formed into said tank base a trough-like depression 102, whereby the suctioning behavior of the device with respect to oblique positions of the tank is optimized by a minimization of the "non-usable volume" for the reducing agent 42. Here, the depression 102 likewise has a trapezoidal cross-sectional geometry. Furthermore, both the elevation 100 and also the depression 102 may have a cross-sectional geometry which deviates from the illustration in FIGS. 9, 10.

In summary, the device according to the invention permits a substantially attitude-independent and temperature-independent supply, to an exhaust-gas aftertreatment system of a diesel engine, of the reducing agent imperative for carrying out the SCR method. In this way, correct functioning of the exhaust-gas aftertreatment system is ensured almost completely independently of the operating conditions of the motor vehicle and at all times. Furthermore, the device permits a precise and likewise substantially attitude-independent determination of the reducing agent level in the storage tank.

What is claimed is:

1. A device (10) for supplying a reducing agent (42) to an exhaust-gas aftertreatment system, having a tank (40) for the reducing agent (42) and having a delivery module (14) for conveying the reducing agent (42) out of the tank (40) via a suctioning line (16), characterized in that
    a) the suctioning line (16), which is disposed at least partially outside the tank (40), is connected to a pump sump (12) situated in the region of a tank base (44),
    b) a pump sump heater (30) is arranged in a region of the pump sump (12),
    c) at least one heating bar (36) extends into the tank (40), and
    d) at least one fill level sensor (18) that is disposed at least partially outside the tank (40), wherein the at least one fill level sensor (18) includes a hose-like body with an interior channel in fluid communication with the pump sump (12) to receive reducing agent (42) from the pump sump (12).

2. The device (10) as claimed in claim 1, wherein the pump sump (12) covers a tank opening (46), and the tank (40) has at least one tank vent (64).

3. The device (10) as claimed in claim 1, wherein at least one compensating element (26) is positioned in the pump sump (12), wherein the compensating element (26) is an annular, elastic element that expands and contracts to absorb freezing and thawing of the reducing agent.

4. The device (10) as claimed in claim 1, wherein at least one filter element (28) is arranged in the region of the pump sump (12).

5. The device (10) as claimed in claim 1, wherein the fill level sensor (18) is formed with at least two resistance wires (80, 82) within the interior channel which are surrounded by a plastics sheathing (84) and which can come into electrically conductive contact with the reducing agent (42) within the interior channel.

6. The device (10) as claimed in claim 1, wherein at least two cables (54, 56) extend within the suctioning line (16).

7. The device (10) as claimed in claim 6, wherein the fill level sensor (18) and the suctioning line (16) and the at least two cables (54, 56) are surrounded at least in portions by a thermal insulation sheathing (22).

8. The device (10) as claimed in claim 7, wherein the at least two cables (54, 56) and the suctioning line (16) run within the fill level sensor (18).

9. The device (10) as claimed in claim 1, wherein the fill level sensor (18) has at least one vent (20).

10. The device (10) as claimed in claim 1, wherein the pump sump (12) is arranged in a region of an elevation (100) or of a depression (102) of the tank base (44).

11. The device (10) as claimed in claim 1, wherein at least two cables (54, 56) for a supply to the electrically heatable suctioning line (16), to the pump sump heater (30) and to the heating bar (36) extend within the suctioning line (16).

12. The device (10) as claimed in claim 1, wherein the heating bar (36) is coupled to the pump sump (12) and extends vertically into the tank (40) from the pump sump (12) to heat frozen reducing agent (42) in the tank (40).

13. The device (10) as claimed in claim 1, wherein the pump sump heater (30) is coupled to the pump sump (12) to heat frozen reducing agent (42) directly above the pump sump (12).

14. The device (10) as claimed in claim 1, wherein the delivery module (14) includes a pump for pumping the reducing agent (42), and wherein the delivery module (14) is disposed outside of the tank.

15. The device (10) as claimed in claim 1, wherein the tank (40) has a tank vent (64), wherein the at least one fill level sensor (18) has a fill level vent (20), and wherein the fill level vent (20) is disposed at a height, relative to the tank base (44), equal to or greater than the tank vent (64).

16. The device (10) as claimed in claim 1, wherein a portion of the at least one fill level sensor (18) extends up alongside the tank (40), such that a fill level of reducing agent (42) in the portion of the at least one fill level sensor (18) is equal to a fill level of reducing agent (42) in the tank (40).

17. The device (10) as claimed in claim 5, wherein the reducing agent (42), when inside the interior channel, defines a fill level (86) in the interior channel, and wherein the two resistance wires (80, 82) form a multiplicity of electrical resistances which, up to the fill level (86), are short-circuited by the reducing agent (42).

18. The device (10) as claimed in claim 17, further comprising a measuring device, wherein an ohmic resistance is measurable between the two wires (80, 82) via the measuring device when the reducing agent (42) is inside the interior channel, and wherein the ohmic resistance is proportional to the fill level (86) of the reducing agent (42).

19. The device (10) as claimed in claim 1, wherein at least two cables (54, 56) extend alongside the suctioning line (16).

20. The device (10) as claimed in claim 1, wherein at least two cables (54, 56) for a supply to the electrically heatable suctioning line (16), to the pump sump heater (30) and to the heating bar (36) extend alongside the suctioning line (16).

* * * * *